(12) United States Patent
Mongeau

(10) Patent No.: US 11,486,425 B2
(45) Date of Patent: Nov. 1, 2022

(54) PAIRED ECCENTRIC CAM ADJUSTER

(71) Applicant: Vestas Wind Systems A/S, Aarhus N. (DK)

(72) Inventor: Peter Mongeau, Center Conway, NH (US)

(73) Assignee: Vestas Wind Systems A/S, Aarhus N (DK)

( * ) Notice: Subject to any disclaimer, the term of this patent is extended or adjusted under 35 U.S.C. 154(b) by 770 days.

(21) Appl. No.: 16/469,431

(22) PCT Filed: Oct. 30, 2017

(86) PCT No.: PCT/DK2017/050354
§ 371 (c)(1),
(2) Date: Jun. 13, 2019

(87) PCT Pub. No.: WO2018/113863
PCT Pub. Date: Jun. 28, 2018

(65) Prior Publication Data
US 2020/0096027 A1    Mar. 26, 2020

Related U.S. Application Data

(60) Provisional application No. 62/436,034, filed on Dec. 19, 2016.

(30) Foreign Application Priority Data

Jan. 6, 2017    (DK) .......................... PA 2017 70007

(51) Int. Cl.
*F16B 5/02*    (2006.01)
*F16B 19/02*   (2006.01)
(Continued)

(52) U.S. Cl.
CPC .............. *F16B 5/025* (2013.01); *F16B 19/02* (2013.01); *F16B 43/00* (2013.01); *F03D 9/25* (2016.05); *F05B 2230/608* (2013.01); *F16B 5/02* (2013.01)

(58) Field of Classification Search
CPC .. F16B 5/004; F16B 5/02; F16B 5/025; F16B 19/02; F16B 43/00; F03D 9/25; F05B 2230/608; Y10T 403/655
(Continued)

(56) References Cited

U.S. PATENT DOCUMENTS 2,216,208 A   10/1940  Michon
3,006,443 A   10/1961  Siler
(Continued)

FOREIGN PATENT DOCUMENTS

DE    2257243 A1   5/1974
GB     478369 A    1/1938

OTHER PUBLICATIONS

European Patent Office, International Search Report and Written Opinion in PCT Application No. PCT/DK2017/050354, dated Jan. 25, 2018.
(Continued)

*Primary Examiner* — Roberta S Delisle
(74) *Attorney, Agent, or Firm* — Wood Herron & Evans LLP

(57) ABSTRACT

The present invention relates to an assembly of a first component (1) and a second component (2) of a wind turbine, the assembly comprises, a paired eccentric cam adjuster (10) adapted for a connection of the first component and the second component of a wind turbine, said components (1,2) each having at least one hole (3,4), the adjuster comprising, a first and second eccentric cam adjuster (7,8), both comprising, a tube (101) with an outer surface and an (Continued)

inner bore (103), with a first central longitudinal axis (321) of the outer surface having an offset (320) from a second central longitudinal axis (322) of the inner bore and a flange (102) arranged at one end of the tube, said cam adjusters (7,8) arranged to be inserted into said holes, and a bolt (5) and a nut (6) arranged to be inserted in the inner bores.

15 Claims, 9 Drawing Sheets

(51) Int. Cl.
*F16B 43/00* (2006.01)
*F03D 9/25* (2016.01)

(58) Field of Classification Search
USPC .................. 403/340, 408.1; 411/935, 935.1
See application file for complete search history.

(56) References Cited

U.S. PATENT DOCUMENTS

| | | | |
|---|---|---|---|
| 3,062,497 A | 11/1962 | Howes | |
| 3,493,249 A * | 2/1970 | Conrad, Jr. | F01D 25/243 285/39 |
| 4,124,258 A | 11/1978 | Hafner | |
| 4,444,365 A | 4/1984 | Heuberger | |
| 5,779,260 A * | 7/1998 | Reilly | B62D 17/00 403/4 |
| 6,131,592 A * | 10/2000 | Panizza | A45B 9/00 403/220 |
| 6,171,195 B1 | 1/2001 | Ferguson | |
| 6,200,059 B1 * | 3/2001 | Sawdon | F16B 5/025 403/DIG. 8 |
| 7,037,027 B2 * | 5/2006 | Steinbeck | F16B 5/025 403/374.1 |
| 8,196,304 B1 | 6/2012 | McBride | |
| 8,226,320 B2 * | 7/2012 | Steinke | F16B 5/025 403/408.1 |
| 8,496,394 B2 * | 7/2013 | Schneider | F16B 5/02 403/337 |
| 8,757,919 B2 * | 6/2014 | Samuelsson | F01D 5/30 403/337 |
| 11,293,465 B2 * | 4/2022 | Brindeau | B64C 1/18 |
| 2009/0169324 A1 | 7/2009 | Fritsch | |
| 2009/0297261 A1 | 12/2009 | Mons | |
| 2012/0141200 A1 | 6/2012 | Kaura et al. | |
| 2021/0210873 A1 * | 7/2021 | Hansen | B29C 66/1122 |

OTHER PUBLICATIONS

Danish Patent and Trademark Office, Search and Examination Report in PA 2017 70007, dated Jun. 9, 2017.

* cited by examiner

PAIRED ECCENTRIC CAM ADJUSTER

FIELD OF THE INVENTION

The present invention relates to a bolted joint of two components in a wind turbine.

BACKGROUND

Permanent magnet (PM) machines, especially large PM machines (such as generators used in Wind Turbines) can experience large relative deflections, distortions, and or misalignment of components due to their weight under the force of gravity. These deflections and misalignments impart undesirable system effects including unwanted loads and stress in components, resulting in negative impact on assembly, performance, life, and reliability of the machine.

Cam adjuster as such is known from the prior art.

It is an object of the invention to provide an ability to compensate for misalignments due to gravity, tolerances, and other effects both in production and in the field when handling large component in wind turbine generators is new about this invention.

SUMMARY

Certain aspects of the present disclosure are generally directed to an assembly of a first component and a second component of a wind turbine, the assembly comprises,
  a paired eccentric cam adjuster adapted for a connection of the first component and the second component, said first component has at least a first hole and said second component has at least a second hole, the paired eccentric cam adjuster comprising,
  a first eccentric cam adjuster and a second eccentric cam adjuster both comprising,
  a tube with an outer surface and an inner bore, wherein a first central longitudinal axis of the outer surface having an offset from a second central longitudinal axis of the inner bore and a flange arranged at one end of the tube,
  the first eccentric cam adjuster arranged to be inserted into the first hole and
  the second eccentric cam adjuster arranged to be inserted into the second hole, and
  a bolt and a nut arranged to be received in the inner bores to join the paired and aligned eccentric cam adjusters.

Certain aspects of the present disclosure are generally directed to a method of connecting a first component and an adjacent second component of a wind turbine with at least one paired eccentric cam adjuster, said paired eccentric cam adjuster comprising, a first eccentric cam adjuster and a second eccentric cam adjuster both comprising, a tube with an outer surface and an inner bore, wherein a first central longitudinal axis of the outer surface having an offset from a second central longitudinal axis of the inner bore and a flange arranged at one end of the tube,
  the method comprises
  inserting the first eccentric cam adjuster into a hole of the first component and
  inserting the second eccentric cam adjuster into a hole of the second component and
  aligning the second central longitudinal axes of the eccentric cam adjusters by rotating the first eccentric cam adjuster and the second eccentric cam adjuster, and
  inserting a bolt and a nut in the inner bores of the eccentric cam adjusters,
  tightening the bolt and the nut, thereby connecting the first component and the adjacent second component of the wind turbine.

Certain aspects of the present disclosure are generally directed to a method further comprises,
  compensating a deformation of at least one of the connecting components, by
  rotating at least one of the first eccentric cam adjuster or the second eccentric cam adjuster.

Certain aspects of the present disclosure are generally directed to a method further comprises
  measuring a electromagnetic balance in an electrical machine in the wind turbine,
  adjusting at least the first eccentric cam adjuster and at least the second eccentric cam adjuster, so to adjust the electromagnetic balance in the electrical machine.

Certain aspects of the present disclosure are generally directed to use of the paired eccentric cam adjuster according to previous aspects, in a bolted joint of two components in a wind turbine.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION

The present invention will now be explained in further details.

This invention addresses this issue by implementation of a paired mechanical eccentric cam (or paired sets of cams) used on each side of two mating components which when properly adjusted compensate or correct for the undesired relative movement between the two components, restoring desired alignment conditions. It is important to notice that the two mating components are joint by a plurality of paired mechanical eccentric cams.

Figure 1:
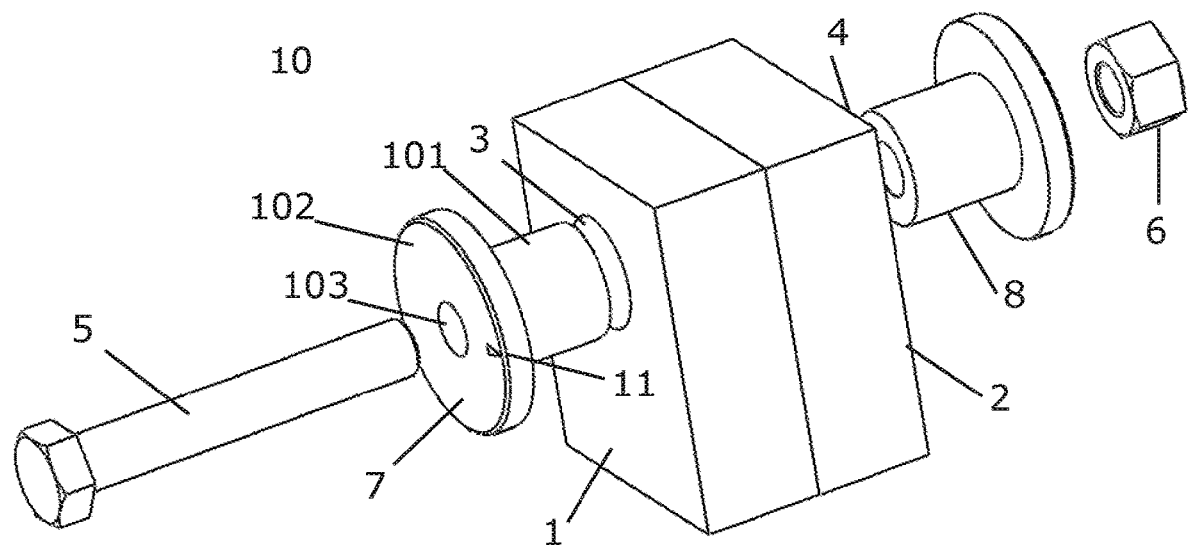
FIG. 1 shows an embodiment of a disassembled paired eccentric cam adjuster.
Figure 2:
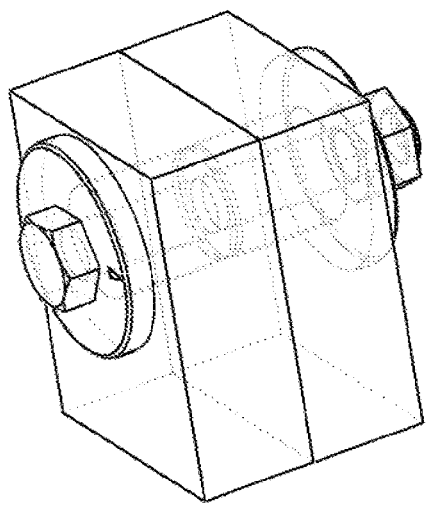
FIG. 2 shows an embodiment of an assembled paired eccentric cam adjuster.

FIG. 1 shows an embodiment of a disassembled paired eccentric cam adjuster. Where FIG. 2 shows an embodiment of an assembled paired eccentric cam adjuster with the same element as shown in FIG. 1.

The paired eccentric cam adjuster comprises a tube with an outer surface and an inner surface, wherein the central longitudinal axis of the outer surface is parallel and offset from the central longitudinal axis of the inner surface. In other word, the Paired eccentric cam adjuster can be considered as sleeve or bushing with an eccentric inner bore.

Further, a flange is arranged at one end of the tube of the paired eccentric cam adjuster. The flange allows adjusting the rotational position of the paired eccentric cam adjuster if being arranged in a hole and provides a stop for the paired eccentric cam adjuster.

FIG. 1 shows the paired eccentric cam adjuster used as adjustment means for two components, which are to be connected to each other, but are not properly aligned with respect to each other, each of component 1 and component 2 has a hole 3, 4, respectively. For connection of components 1 and 2, for example, a bolt 5 and a nut 6 are used. Before the inserting of the screw 5, a first eccentric cam adjuster 7 is inserted into the hole 3 and a further eccentric cam adjuster 8 is inserted into the hole 4.

Each of the eccentric cam adjusters 7,8 has a tube 101 with an outer surface and an inner bore 103 and a flange (102) arranged at one end of the tube. The eccentric cam adjuster 7 furthermore has an index pointer 11.

In an embodiment the holes 3 and 4 are aligned with respect to each other, therefore the eccentric cam adjusters 7 and 8 are positioned in a "mirror-image"-like arrangement, where the central longitudinal axes of the outer surfaces coincide and the central longitudinal axes of the inner surfaces coincide.

In another embodiment the holes 3 and 4 are not aligned with respect to each other, at least one of the eccentric cam adjusters 7 and 8 is rotated such that the central longitudinal axes of the inner surfaces still coincide, while central longitudinal axes of the outer surfaces do not coincide.

Since the central longitudinal axes of the inner surfaces coincide in any case, the bolt 5 can be inserted through the hollow inner spaces of the paired eccentric cam adjusters 7 and 8 and the nut 6 can be tightened, whereby the components 1 and 2 are connected with each other.

The sum of the eccentricity of the two eccentric cam adjusters sets the limit for the misalignment which can be compensated by the paired eccentric cam adjusters 7 and 8.

Figure 3:
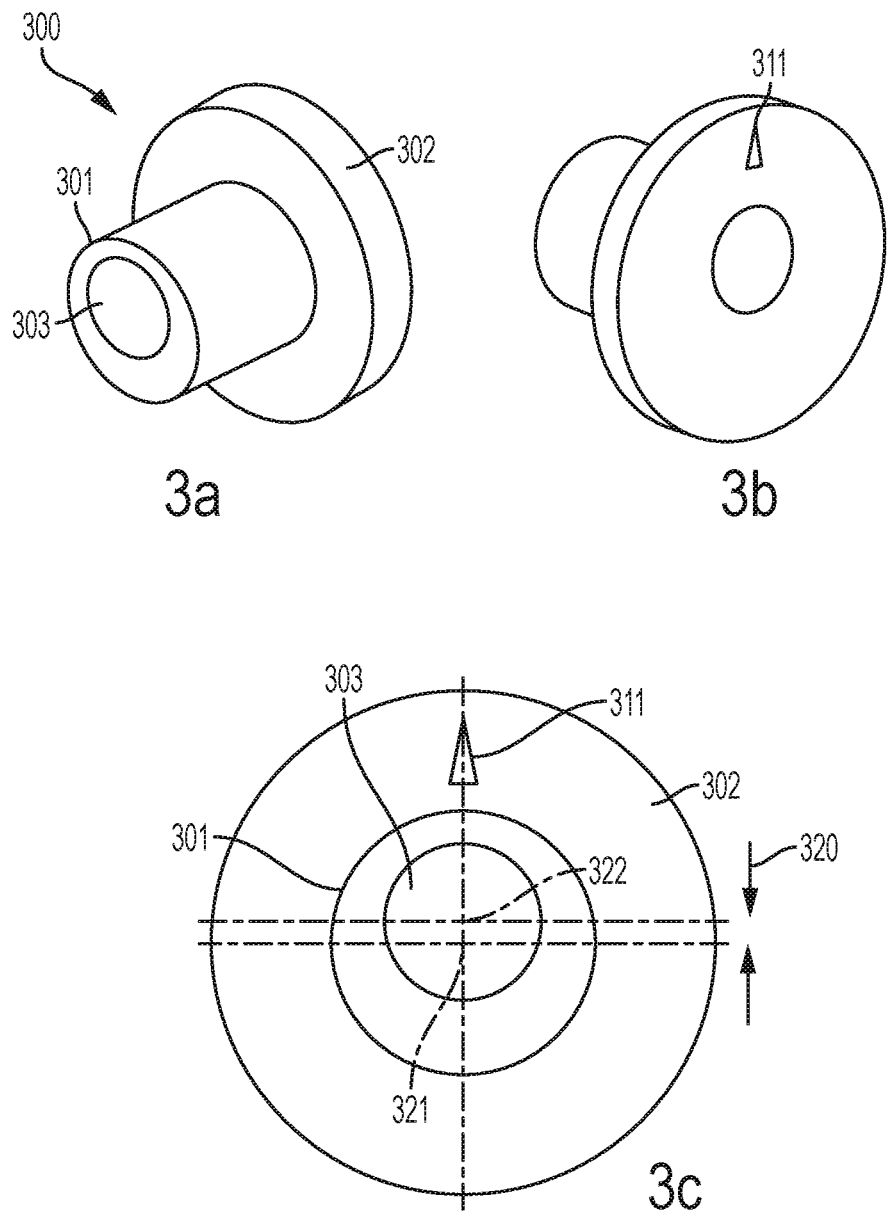
FIG. 3 shows an eccentric cam in maximum offset positions—up-wards.

FIG. 3 shows an eccentric cam 300 in maximum offset positions 320—up-wards. FIG. 3a shows the eccentric cam 300 from the tube end, with the tube 301, where the eccentric inner bore 303 is in its maximum top position as indicated in FIG. 3B, which shows the eccentric cam 300 from the flange 302, the index indicator 311 pointing up.

FIG. 3c shows a schematic end view of an eccentric cam where the max adjustment range 320 is indicated. The tube 301 or even the flange has a first central longitudinal axis (321) of the outer surface. The inner bore 303 has a second central longitudinal axis (322). The first central longitudinal axis (321) and the second central longitudinal axis (322) are having an offset (320) from each others.

Figure 4:
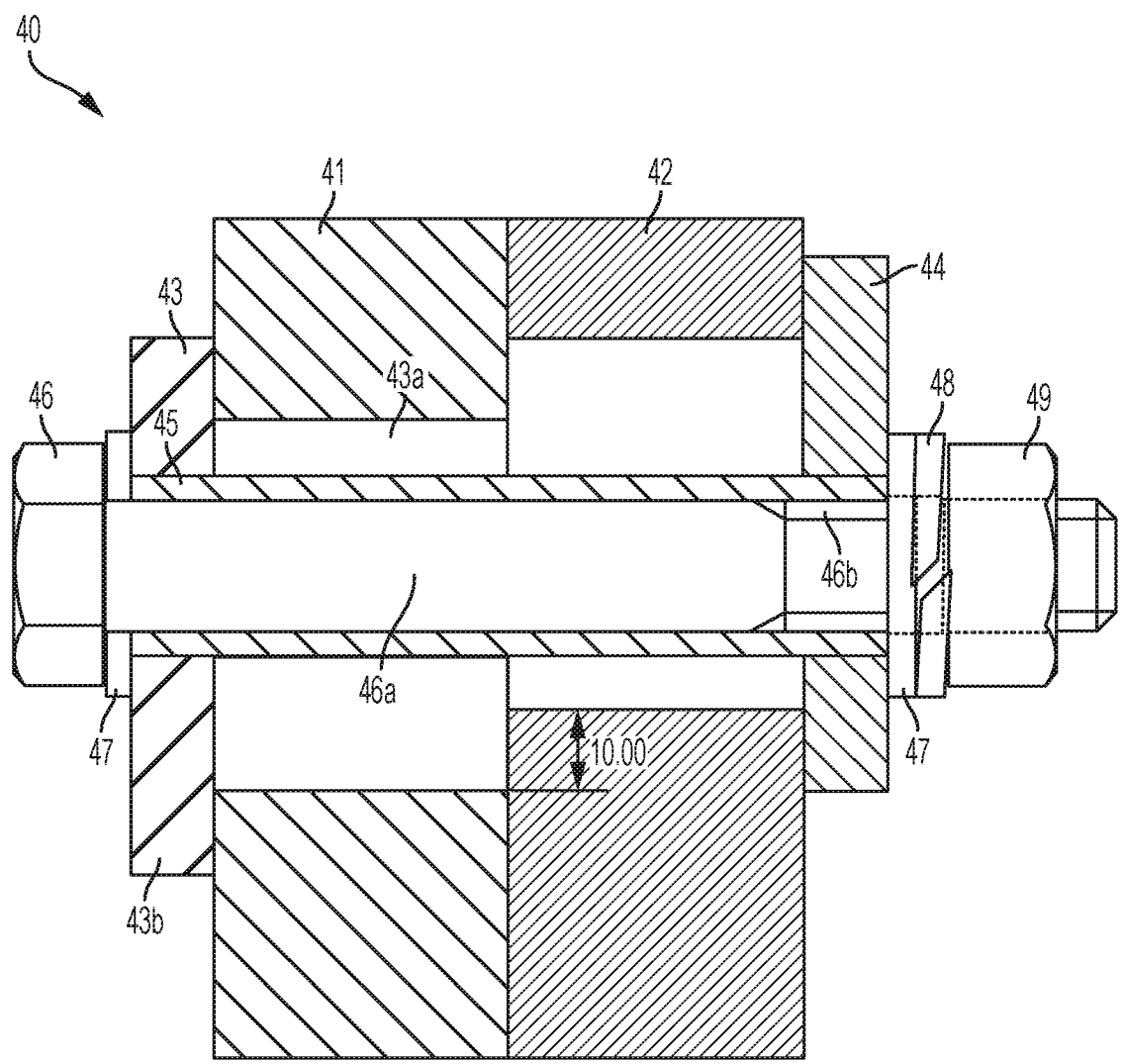
FIG. 4 shows an example of an eccentric cam with a shear tube inserted.

FIG. 4 shows an embodiment with eccentric cam adjusters with a shear tube inserted in the inner bore formed when the inner bores of the first cam and the second cam are aligned. In FIG. 4 the first cam and the second cam are rotated 180 degrees from each other, illustrating maximum offset range (±5 mm).

In detail FIG. 4 shows a first flange 41 and a second flange 42, each of the flanges having a hole, in which an adjustable cam is inserted in each flange. The cam adjusters having a tube/bushing part 43a and an outer flange 43b, furthermore the cam adjusters have an eccentric inner bore. Although the holes in the flanges are misaligned, a common path is established through the inner bores of the two cam adjusters, in which a steel shear tube 45 goes through. The steel shear tube 45 provides a high shear force strength in respect of keeping the first and second flanges 41, 42 in place.

An M16 bolt 46 with a washer 47 on the first side is inserted in the steel shear tube 45, on the other side a spring washer 48 is applied and a hex nut 49 ensures the fixation of the paired adjustable cam 43, 44. The bolt 46 is chosen to obtain a minimal slack in the steel shear tube 45, the bolt has a non-threaded part 46a and a threaded part 46b.

In order to ease the insertion of the shear tube, the eccentric inner bore has a dimension which is slightly larger than the outer diameter of the shear tube.

In FIG. 4, the bolt, which is only used to provide axial pre-load, i.e. moment gravity loads. The joint shear loads (gravity, torque) are managed by the shear tube 45, and the eccentric cam adjusters are rotated to provide tight radial pre-load on flange holes, thereby locking the slack between the inner bores and the shear tube.

In an embodiment all surfaces (except bolt/nut) are lubricated, which facilitates easier disassembly.

In an embodiment, in a wind turbine the paired adjustable cams is used in master fixture to a stator housing mounting flange.

The advantage of this embodiment is that the generator position is not maintained by friction (from axial bolt tension load), but from shear forces of the shear tube.

The advantage of having the shear tube inserted in the two adjusters eccentric cam is that it takes out the clearance in the fastenings holes, and that it provides shear loading instead of frictional loading. The loads on the bolt is decoupled from the shear load, which is now handled by the shear.

The bolt can be designed for clearance without interfering with the shear tube. The bolt is therefore sized "purely" for tension.

Another advantage of having the shear tube is that it makes it much easier for disassembly of the joint tied with the cam adjusters, as the bolt, which goes through the bushing, is no longer stuck by frictional forces, but can glide within the bushing.

The joint flanges are tied by a combination of frictional and shear forces.

In an embodiment two flanges are tied together by a plurality of paired cam adjusters, each pair having a shear tube inserted in the inner bore formed by aligned paired cams.

The materiel of the bushing can be an alloy of metal, such as steel or other known material, used for fasteners.

The material can also be a ceramics with a metal core or other material, which provides an electrical insulation.

The advantages of such an arranged joint with properly adjusted eccentric cams are that not only can the relative position of the two flanges be adjusted, but once so located, this alignment is not dependent on the friction forces between these flanges. The bolting members can now be sized and preloaded for the tensile forces only associated with normal operation.

The internal shear tube, if used, provides an additional degree of functional differentiation where the shear tube can be sized for shear loads, the bolts sized for tensile loads and the eccentric cams properly adjusted for position.

Figure 4A:
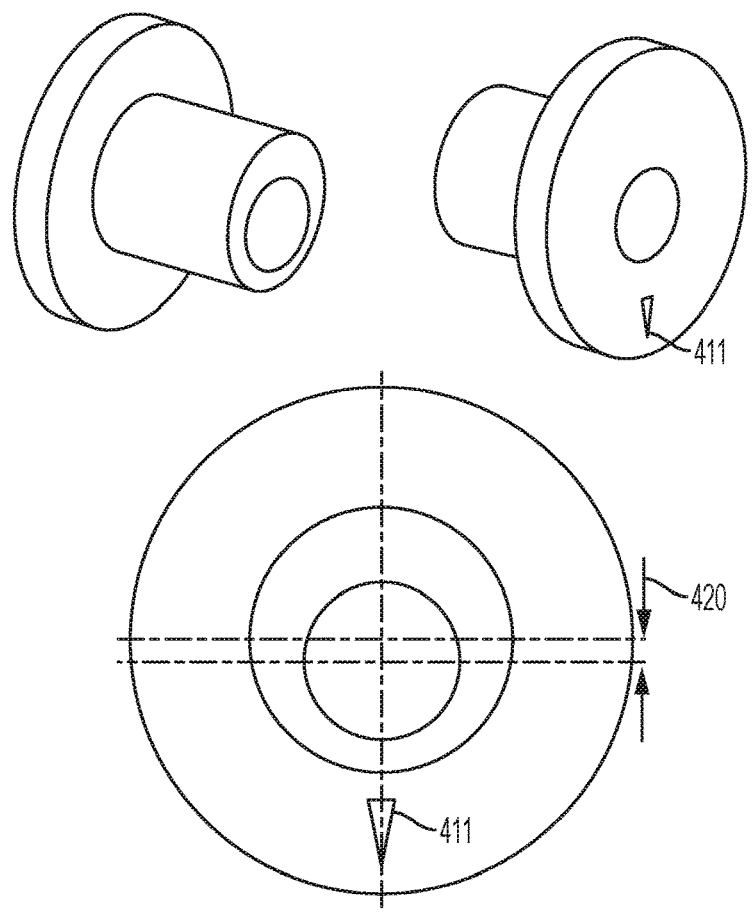
FIG. 4a shows an eccentric cam in maximum offset positions—down-wards.

FIG. 4a shows an eccentric cam in maximum offset positions—down-wards. FIG. 4a has the same elements as FIG. 3; the two figures differ in the orientation of the index pointers 311 and 411. In FIG. 4a the offset position is downward and shown as the distance 420.

In an embodiment the paired eccentric cam adjuster 10 with the first eccentric cam adjuster 7 and/or the second eccentric cam adjuster 8, has the flange (102) with a polygons shape with at least two parallel sides.

Figure 4B:
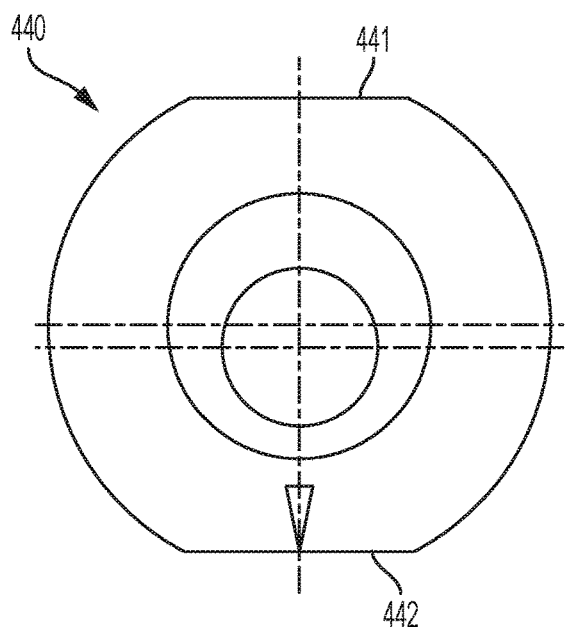
FIG. 4b shows an eccentric cam with a flange having a set of parallel sides.

FIG. 4b shows an embodiment of an eccentric cam adjuster 440 with two parallel sides 441 and 442.

The parallel sides having the function of giving contact surface for a tool for positioning the eccentric cam adjusters according to a requested alignment.

During service it is important to be able adjust the eccentric cam adjusters, it is therefore important that the service team is provided with a way to rotate the eccentric cam adjuster, even if the eccentric cam adjuster is stuck in the component in which it is inserted, due to rust/oxidation or thermal expansion of the materials.

Figure 4C:
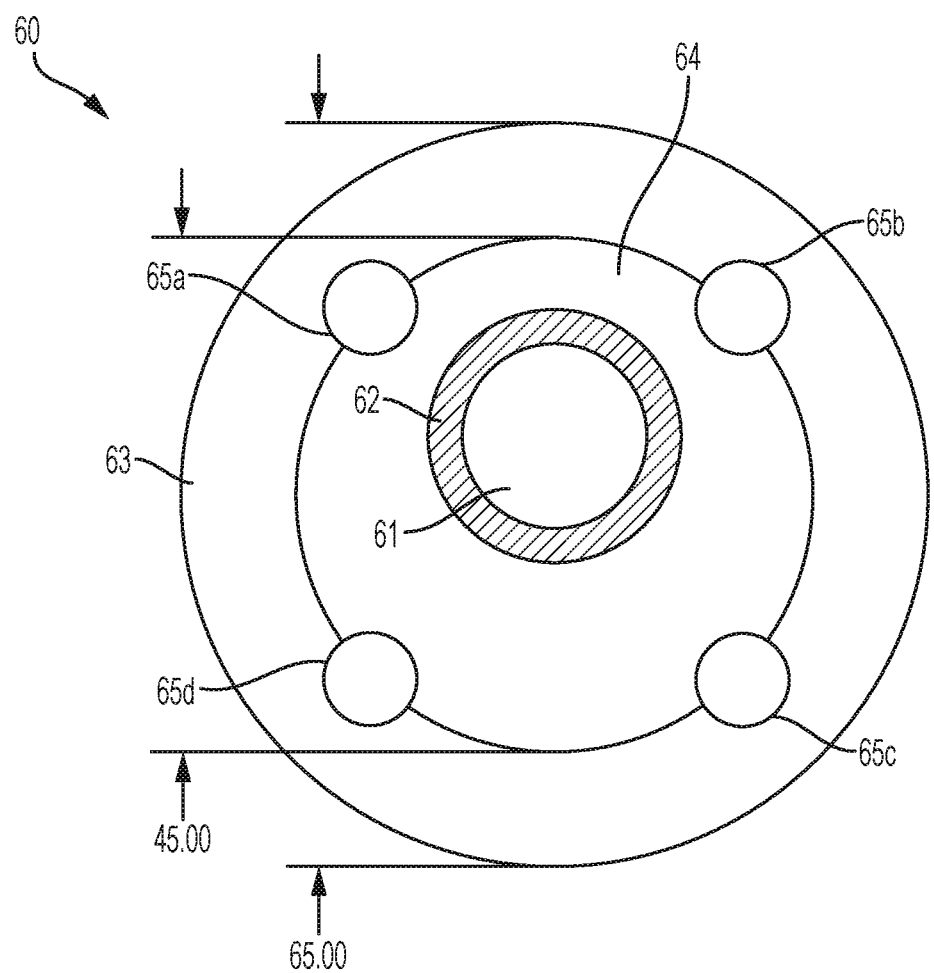
FIG. 4c shows an eccentric cam with a flange having a four holes in outer flange for a adjustment.

FIG. 4c shows an end view of an adjustable cam 60 according to an embodiment, where the central hole 61 is offset 5 mm from true center of the cam 60, a steel shear tube 62 is seen as descripted for FIG. 4. The cam 60 has an outer flange 63 and a tube 64. A set of four holes 65a, 65b, 65c, 65d is made in the outer flange 63, which can be used for applying a custom spanner wrench (not shown). The cam 60 has an outer flange 63 diameter of 65 mm and a tube 64 diameter of 45 mm.

FIG. 5 to FIG. 8 shows embodiments with paired eccentric cam adjustors showing the range of motion for a 5 mm paired eccentric cam.

Figure 5:
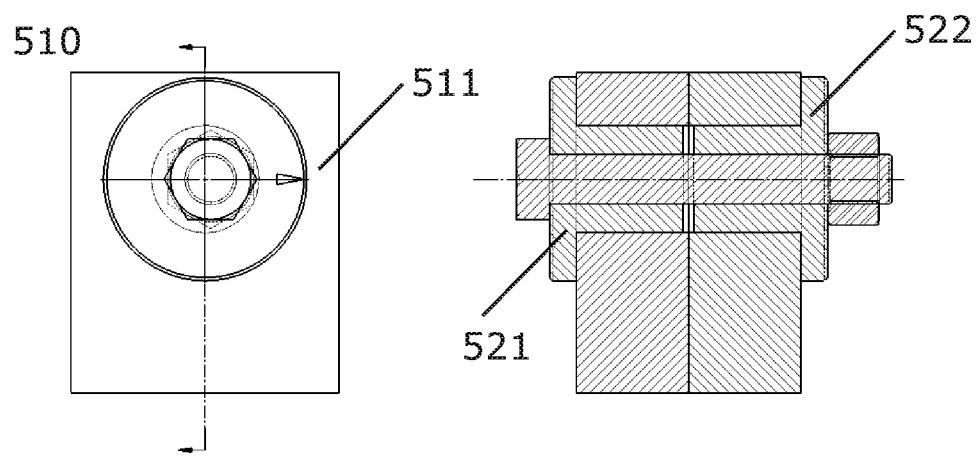
FIG. 5 shows the cams in nominal condition—no relative offset or adjustment.

In FIG. 5 the cams are in nominal condition—no relative offset or adjustment. The left part FIG. 5 shows an end view of the paired eccentric cam 510, whereas the right part of FIG. 5 shows a side view. The paired eccentric cam 510 has the index pointers 511, for each of the cams 521, 522 pointing in the same direction, i.e. no offset is obtained.

Figure 6:
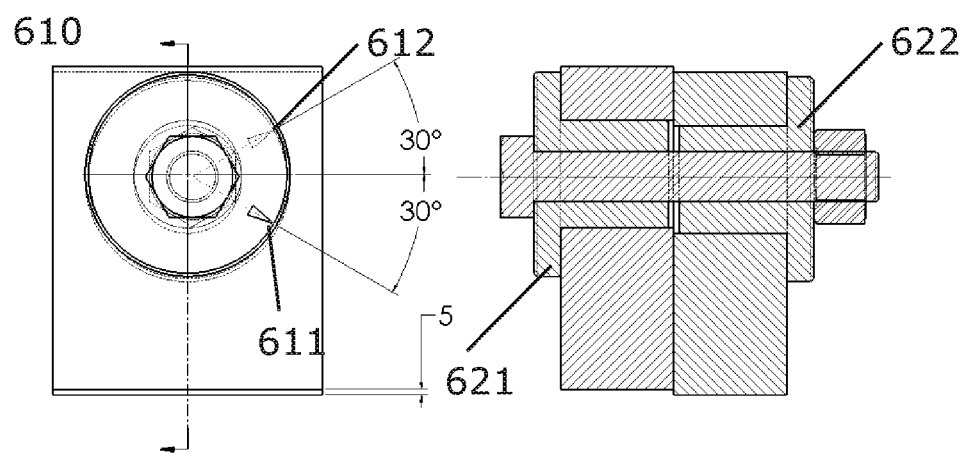
FIG. 6 shows the cams in 30 degrees turn results in 5 mm shift.

FIG. 6 shows the cams in 30 degree turn which results in a 5 mm shift. The left part FIG. 6 shows an end view of the paired eccentric cam 610, whereas the right part of FIG. 6 shows a side view. The paired eccentric cam 610 shows the index pointers 611 612, for each of the cams 621, 622 pointing with an offset of 30 degrees each, i.e. an offset of 5 mm is obtained.

Figure 7:
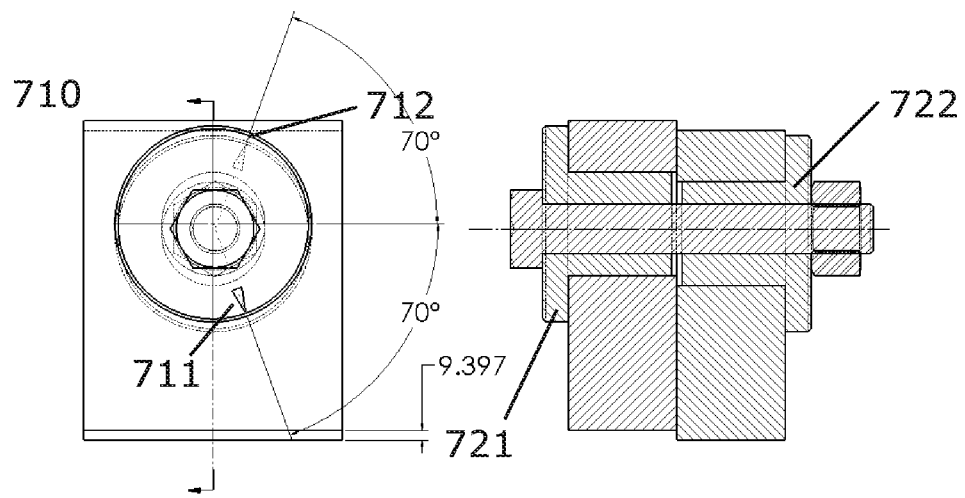
FIG. 7 shows the cams in 70 degrees turn results in 9.397 mm shift.

FIG. 7 shows the cams in 70 deg turn which results in a 9.397 mm shift. The left part FIG. 7 shows an end view of the paired eccentric cam 710, whereas the right part of FIG. 7 shows a side view. The paired eccentric cam 710 shows the index pointers 711 712, for each of the cams 721, 722 pointing with an offset of 70 degrees each, i.e. an offset of 9.397 mm is obtained.

Figure 8:
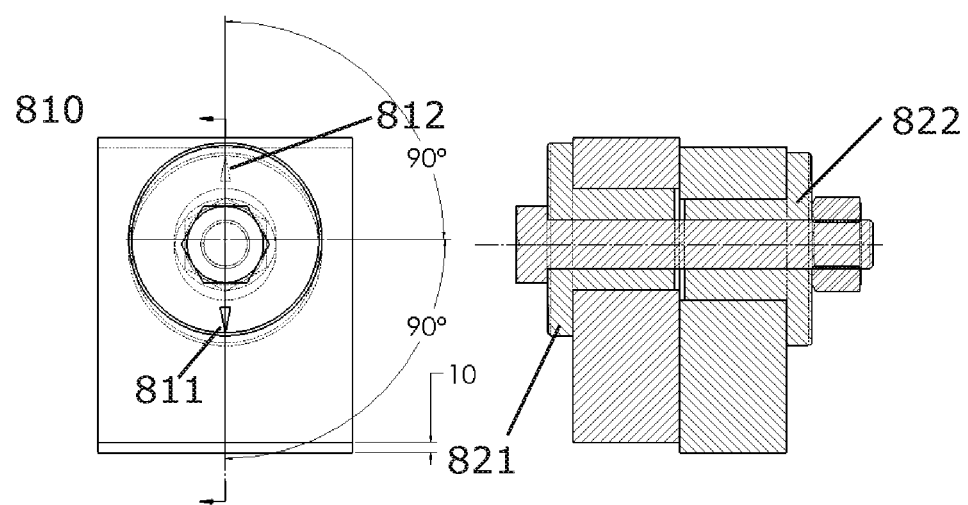
FIG. 8 shows the cams in 90 degrees turn results in full range 10 mm shift.

FIG. 8 shows the cams in 90 deg turn which results in full a range of 10 mm shift. The left part FIG. 8 shows an end view of the paired eccentric cam 810, whereas the right part of FIG. 8 shows a side view. The paired eccentric cam 810 shows the index pointers 811 812, for each of the cams 821, 822 pointing with an offset of 90 degrees each, i.e. an offset of 10 mm is obtained.

All the offsets shown in the Figures, show a displacement in the Z direction 900. It should be apparent for the skilled person that the displacement provided by the eccentric cam adjusters 7, 8 can be in any directions in the X-Z plane.

Modern large permanent magnet generators and gearboxes are often designed with large diameters, while still having an air gap or tolerances of a few millimeters. The small gap causes any air gap deviations to variate the magnetic field seen in generator stator. It is therefore extremely important that a method for adjusting the air gap or position or shape of large components is available.

Figure 9:
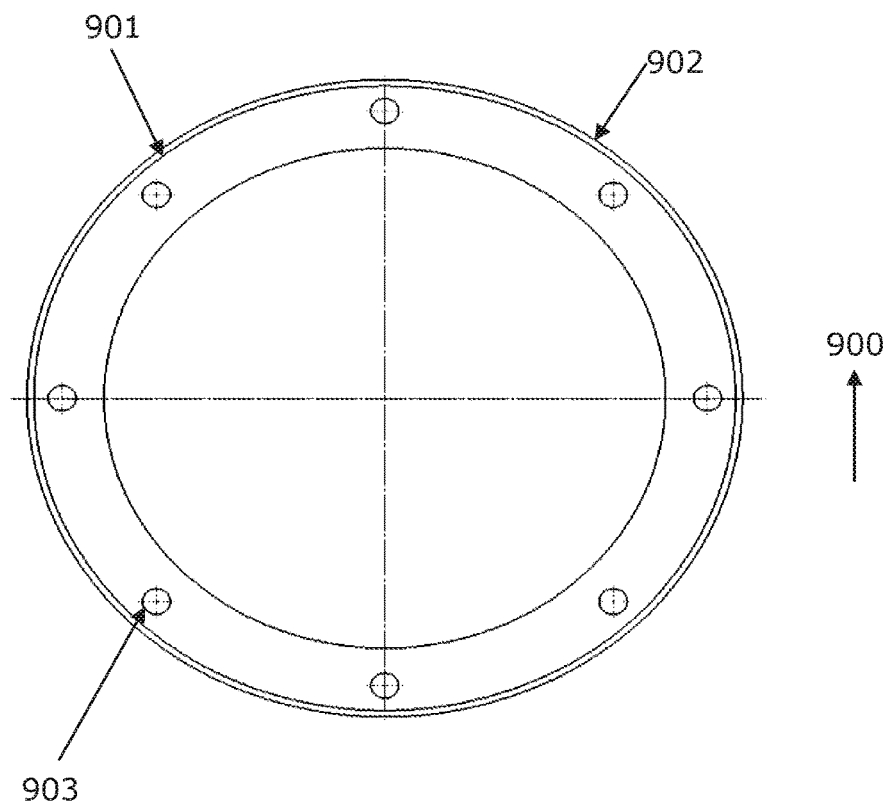
FIG. 9 shows an example of two structural components in front of each other.

The following examples illustrate several embodiments of how the examples of the invention can be implemented. FIG. 9, relates to alignment of a large fixed body 901 (for example a windturbine gearbox) to a mounted large 2nd body 902 (for example a generator), each of the large bodies 901, 902 has a plurality of holes 903 for inserting bolts and nuts.

FIG. 9 shows an initial condition of aligning two elements, here a Front (Fixed) Plate OD 901 and a Rear Plate OD 902. A plurality of Adjustor Holes 903. As both plates are aligned, all holes and diameters are aligned.

Figure 10:
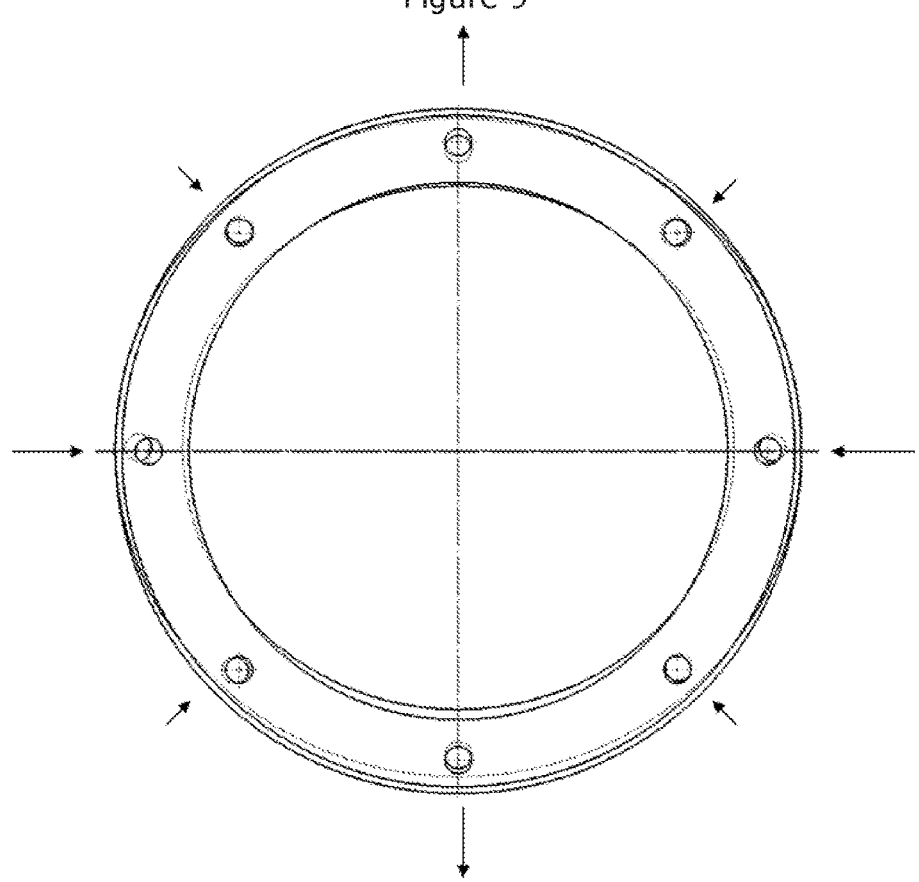
FIG. 10 shows an application for a paired eccentric cam with a simple one direction center correction.

In case there is a requirement for lowering Rear Plate OD 902 by moving plate center 5 mm, paired eccentric cams are required. FIG. 10 shows in detail this scenario.

Permanent magnet (PM) machines, especially large PM machines, such as generators used in wind turbines, can experience large relative deflections, distortions, and or misalignment of components due to their weight under the force of gravity. These deflections and misalignments impart undesirable system effects including unwanted loads and stress in components, resulting in negative impact on assembly, performance, life, and reliability of the machine.

This issue is addressed by the paired mechanical eccentric cam (or paired sets of cams) used on each side of two mating components which when properly adjusted compensate or correct for the undesired relative movement between the two components, restoring desired alignment conditions.

An advantage of the embodiments when used in relation to an electrical generator is that the paired eccentric cam can be adjusted over the lifetime of the generator.

Furthermore, the precise electrical and mechanical alignment of the two separate rotor and stator assemblies can be adjusted in situ. This greatly facilitates service and repair of said assemblies which may require these parts to be separated and thus lose whatever alignment they originally had.

If one considers the direction of gravity to be in the opposite direction of the Z direction 900 it could be envisioned that a rotor subassembly residing inside a large electrical generator deflects (or sags) in the −Z direction due to gravity. This could cause an undesired misalignment between the stator and the rotor. This misalignment can be corrected or compensated for by proper installation and adjustment of the aforementioned eccentric cams.

In an embodiment a plurality of paired eccentric cam adjusters 10 are used to offset an electrical rotor from the stator of an electrical generator.

For instance in this case, the generator side could be lowered in the −Z direction to match the Z offset of the rotor, thus restoring the desired magnetic air gap thickness. See FIG. 10.

In an embodiment a plurality of paired eccentric cam adjusters 10 are used to offset an electrical rotor from the stator of an electrical generator. Where measuring a electromagnetic balance in an electrical machine in the wind turbine, is followed by adjusting at least the first eccentric cam adjuster 7 and at least the second eccentric cam adjuster

8, so to adjust the electromagnetic balance in the electrical machine and to balance unbalanced magnetic pull, or electrical balance in the electrical circuits of the generator.

In FIG. 10 the paired eccentric cam adjustors are turned to incur desired shift (one direction) in rear plate. In this example one could consider the rear "plate" to be the mounting rim of the generator and the front plate the gearbox. Inside the generator the large rotor has deflected due to gravity decreasing rotor/stator airgap in −Z. To compensate for this misalignment the generator side is lowered using the eccentric cam adjustors restoring the intended airgap dimension.

Secondly, another example applies in the case of a large, hollow, concentric components (for example the generator housing of a large wind turbine generator). Other application could be gearbox, generator, main shaft, rotor blade hub, etc.

Figure 11:
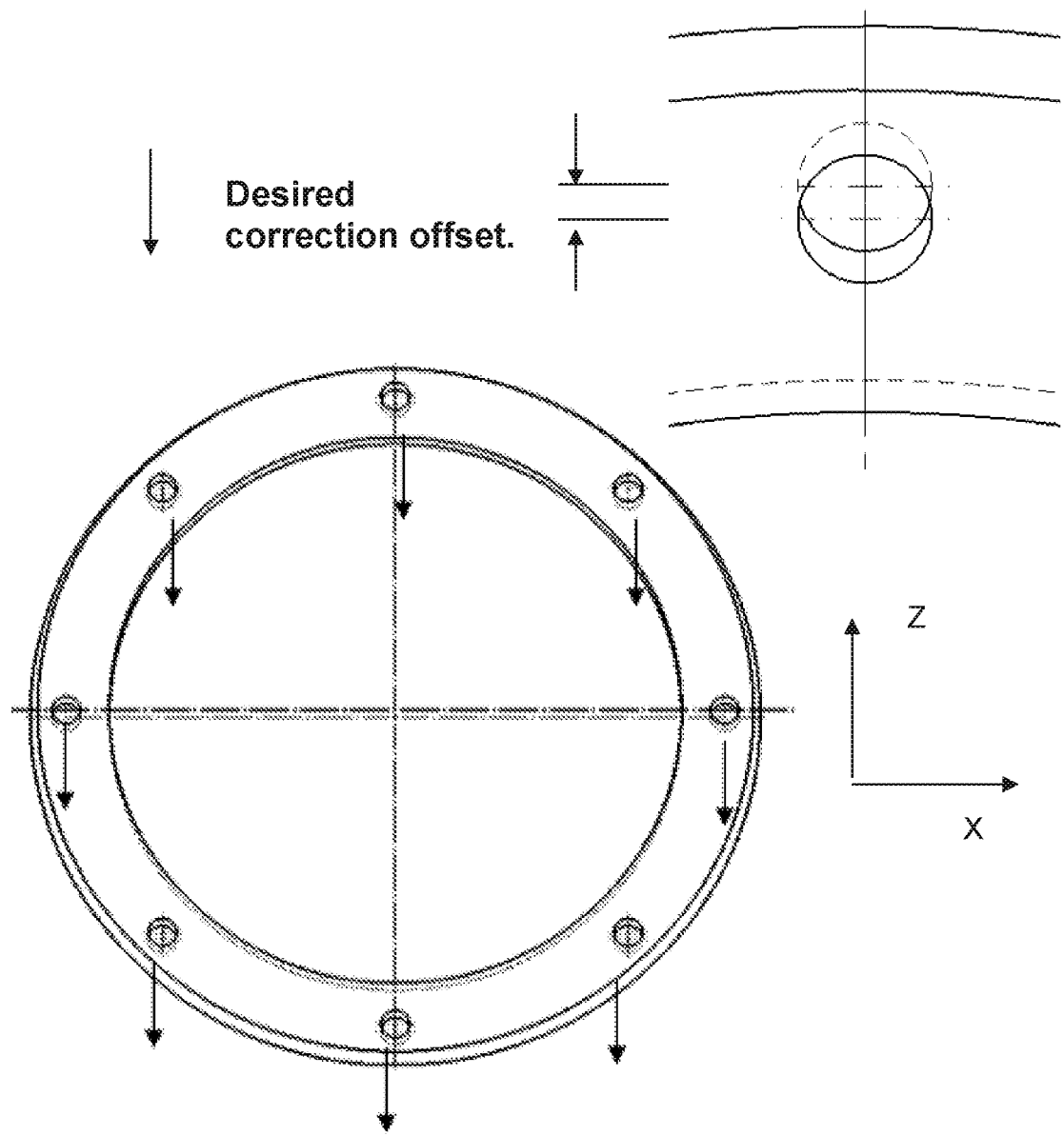
FIG. 11 shows an application for a paired eccentric cam with an Eccentric Adjust: Correction of internal elastic deformation due to force of gravity on component mass.

Referring to FIG. 11 the intended and designed shape of the component is circular. However as shown in the indicated orientation (operating orientation), the component distorts due to its own weight under the force of gravity into a non-round condition. In this case a set of paired eccentric cams would be implemented between the housing and its mating component (for instance a Gearbox) and properly adjusted in order to correct for this radial distortion, restoring alignment between the rotor and gearbox.

The paired eccentric cam adjuster serves as means of altering or adjusting misalignment and/or relative mechanical position of components in electromagnetic machines (e.g. permanent magnet generators) used in wind turbines with the purpose of correcting or compensating for unwanted deflections, misalignment or distortions in the components or system.

In an embodiment a plurality of paired eccentric cams join the first component (1) and the adjacent second component (2), allowing for adjusting the plurality of paired eccentric cams to correct an radial distortion.

In an embodiment a plurality of paired eccentric cams join the first component (1) and the adjacent second component (2), allowing for adjusting the plurality of paired eccentric cams to correct a gravitational distortion.

FIG. 11 shows an example of a distorted (oval shape) generator housing mounted to a stiff round gearbox flange. The eccentric adjustors are inserted into each side of the misaligned holes.

The Eccentric Adjustors are then properly adjusted (turned) to produce the desired corrective alignment at each individual location. Note that each adjustor requires individual adjustment to incur the desired restoration of shape. For example, at the top of the housing a +Z restorative deformation is required. On the right side of the housing a −X restorative deformation is required, etc.

The functional advantage of the embodiments is a highly increased feasibility in construction of large wind turbine components, such as permanent magnet machines, gearboxes etc. Also reduced mechanical stress in the system (for example stress on bearings due to deflected rotor due to gravitational force) and decreased imbalance in the rotational system are an advantages achieved when applying paired eccentric cam adjusters in wind turbine generators. In addition it allows, in the case of generators, for the rotor and stator subassemblies to be aligned in accordance with their electromagnetic centers, thus reducing off-axis forces, or imbalance in multiple generator circuits. It should be noted that such electromagnetic centering is not always coincident with other observable features such as mechanical air-gap.

In general the paired eccentric cam adjuster can be used to connect all structural parts in the wind turbine; this can be the generator, gearbox, base frame, rotor hub, rotor blade, tower segment etc.

An additional functionality that is possible in this approach—i.e. many bolted joint connections are based purely on preloaded friction. Although there is plenty of bolt shear area available for handling torque one are not permitted to account for more than 1-2 bolt shear load sharing (except for large plastic deformation fault cases) because of finite clearances between the bolts and holes. This approach provides a way to take the clearance in the holes and put the bolt into some predetermined state of shear preload, which will allow even more load sharing.

In other words—the paired eccentric cam adjuster acts a bit like the expanding bolts' concepts known from the prior art, and often used for pinned joints, but primarily along one pre-determined off-axis direction. The expanding bolts are actually loaded up in all directions. A clear disadvantage of expanding bolts are that they can be very expensive, and disassembly is difficult.

In an embodiment with an annulus gear/flange joint, the key issue is heat treatment distortion of the gear, leading to a position offset between the bolt hole in the flange and the thread in the annulus gear. This causes bad load sharing between the bolts/pins, and this bad load sharing needs to be compensated by increasing the number of bolts/pins (by 50% or so).

An advantage of this embodiment is that the eccentric cam adjusters will be able to deal with much fewer bolts, and relax manufacturing accuracy at the same time.

As a result of the above mentioned advantages an increased reliability and increased life of the components in the WTG are expected.

In a service aspect of the embodiments it is clear that a potential of adjusting or tuning alignment of components in the field during installation and assembly will provide better alignment of the main components, or even during scheduled service routines, where wear and tear calls for a realignment of main components.

The potential of correcting developed misalignments on-site in the field (for example due to wear or shifting of components) as opposed to needing to service in the factory, is clearly a benefit, as production down time is limited.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention.

The invention claimed is:

1. A wind turbine, comprising:
    an assembly of a first component and a second component, wherein the first and second components are main components of the wind turbine, and
    a plurality of paired eccentric cam adjusters adapted for a connection of the first component and the second component, wherein said first component has at least a first hole and said second component has at least a second hole, and wherein each of the paired eccentric cam adjusters comprises:
a first eccentric cam adjuster;
a second eccentric cam adjuster, wherein each of the first and second eccentric cam adjusters comprises:
a tube including an outer surface having a first central longitudinal axis and an inner bore having a second central longitudinal axis, wherein the first central longitudinal axis of the outer surface is offset from second central longitudinal axis of the inner bore; and
a flange arranged at one end of the tube,
wherein the first eccentric cam adjuster is arranged to be inserted into the first hole of the first component and the second eccentric cam adjuster is arranged to be inserted into the second hole of the second component, and
a bolt and nut fastener arranged to be received in the inner bores of the first and second eccentric cam adjusters to form said paired eccentric cam adjuster.

2. The wind turbine according to claim 1, wherein said assembly further comprises a shear tube received in the inner bores of the first and second eccentric cam adjusters, the shear tube having a length covering the inner bores of the first and second eccentric cam adjusters, thereby providing shear force strength between the first component and the second component.

3. The wind turbine according to claim 1, wherein at least one of the first eccentric cam adjuster and the second eccentric cam adjuster has an index to show a direction of the eccentricity of the paired eccentric cam adjuster.

4. The wind turbine according to claim 1, wherein when the first and second holes are aligned with respect to each other, the paired eccentric cam adjuster is positioned in a mirror-image arrangement, where the first central longitudinal axes of the first and second eccentric cam adjusters coincide and the second central longitudinal axes of the first and second eccentric cam adjusters coincide.

5. The wind turbine according to claim 1, wherein the flange of the first eccentric cam adjuster and/or the second eccentric cam adjuster has a polygon shape with at least two parallel sides.

6. The wind turbine according to claim 1, wherein the first and second eccentric cam adjusters are made from insulating materials so as to maintain electrical isolation between the first component and the second component.

7. A method of connecting components of a wind turbine, comprising:
providing a first component and an adjacent second component, wherein the first component and the second component are main components of the wind turbine,
providing a plurality of paired eccentric cam adjusters adapted for a connection of the first component and the second component, each of the plurality of paired eccentric cam adjusters comprising:
a first eccentric cam adjuster;
a second eccentric cam adjuster, wherein each of the first and second eccentric cam adjusters comprises:
a tube including an outer surface having a first central longitudinal axis and an inner bore having a second central longitudinal axis, wherein the first central longitudinal axis of the outer surface is offset from second central longitudinal axis of the inner bore; and
a flange arranged at one end of the tube,
the method further comprising, for each of the plurality of paired cam adjusters:
inserting the first eccentric cam adjuster into a hole of the first component;
inserting the second eccentric cam adjuster into a hole of the second component;
aligning the second central longitudinal axes of the first and second eccentric cam adjusters by rotating at least one of the first eccentric cam adjuster and the second eccentric cam adjuster;
inserting a bolt and a nut fastener in the inner bores of the first and second eccentric cam adjusters; and
tightening the bolt and the nut, thereby connecting the first component and the adjacent second component of the wind turbine.

8. The method according to claim 7, wherein the plurality of paired eccentric cam adjusters are restoring alignment between the first component and the adjacent second component of the wind turbine.

9. The method according to claim 7, wherein the first component and the adjacent second component are two structural parts in the wind turbine.

10. The method according to claim 7, wherein rotating at least one of the first eccentric cam adjuster and the second eccentric cam adjuster compensates for a deformation of at least one of the first and second components.

11. The method according to claim 7, further comprising adjusting the plurality of paired eccentric cams to correct a radial distortion.

12. The method according to claim 7, further comprising adjusting the plurality of paired eccentric cams to correct a gravitational distortion.

13. A method of connecting a rotor and a stator of an electrical generator of a wind turbine, comprising:
providing a plurality of paired eccentric cam adjusters connecting the rotor and the stator of the electrical generator, each of the plurality of paired eccentric cam adjusters comprising:
a first eccentric cam adjuster;
a second eccentric cam adjuster, wherein each of the first and second eccentric cam adjusters comprises:
a tube including an outer surface having a first central longitudinal axis and an inner bore having a second central longitudinal axis, wherein the first central longitudinal axis of the outer surface is offset from second central longitudinal axis of the inner bore; and
a flange arranged at one end of the tube,
the method further comprising, for each of the plurality of paired cam adjusters:
inserting the first eccentric cam adjuster into a hole of the rotor;
inserting the second eccentric cam adjuster into a hole of the stator;
aligning the second central longitudinal axes of the first and second eccentric cam adjusters by rotating at least one of the first eccentric cam adjuster and the second eccentric cam adjuster;
inserting a bolt and a nut fastener in the inner bores of the first and second eccentric cam adjusters; and
tightening the bolt and the nut, thereby connecting the rotor and the stator of the generator.

14. The method according to claim 13, wherein the method further comprises:
measuring an air gap in the electrical generator in the wind turbine; and adjusting at least one of the plurality of paired eccentric cam adjusters so as to adjust the air gap of the electrical generator.

15. The method according to claim 13, wherein the method further comprises:
measuring an electromagnetic balance in the electrical generator in the wind turbine; and
adjusting at least one of the plurality of paired eccentric cam adjusters so as to adjust the electromagnetic balance in the electrical generator.

* * * * *